United States Patent
Chandrashekar et al.

(10) Patent No.: US 10,915,351 B2
(45) Date of Patent: Feb. 9, 2021

(54) CELLULAR HYPERVISOR

(71) Applicant: INTERNATIONAL BUSINESS MACHINES CORPORATION, Armonk, NY (US)

(72) Inventors: Shiva P. Chandrashekar, Bangalore (IN); Ashoka S. Rao, Bangalore (IN); Sreekrishnan Venkateswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 16/117,219

(22) Filed: Aug. 30, 2018

(65) Prior Publication Data

US 2020/0073690 A1 Mar. 5, 2020

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5027* (2013.01); *G06F 9/5072* (2013.01);
(Continued)

(58) Field of Classification Search
None
See application file for complete search history.

(56) References Cited

U.S. PATENT DOCUMENTS 8,355,711 B2  1/2013  Heins et al.
8,612,580 B2* 12/2013  Gandhi ................ G06F 9/5027
                                                          709/224
(Continued)

FOREIGN PATENT DOCUMENTS

EP          2972834 A1    1/2016
WO    WO2013078140 A1    5/2013

OTHER PUBLICATIONS

Peter Mell et al, The NIST Definition of Cloud Computing, National Institute of Standards and Technology, Publication 800-145, 2011.
(Continued)

*Primary Examiner* — Umut Onat
(74) *Attorney, Agent, or Firm* — Patrick J. Daugherty; Daugherty & Del Zoppo Co., LPA

(57) ABSTRACT

Aspects utilize a computing processing capability of a device connected to a cellular network wherein processors are configured to determine processing capabilities of each of a plurality of devices as function of device hardware configuration, software configuration, and average idle utilization, determine first remaining uptime periods of availability that each of the plurality of devices are available for data processing as a function of respective device data comprising battery level, signal strength and usage patterns, wherein the usage patterns are power usage patterns or data usage patterns, in response to receiving a processing task that comprises a needed processing capability, identify a subset of devices that each have a threshold amount of uptime of processing capability in an amount inclusive of the needed processing capability of the task, and assign the processing task to one of the subset devices.

20 Claims, 5 Drawing Sheets

(51) Int. Cl.
*H04L 12/24* (2006.01)
*H04L 29/08* (2006.01)
*G06F 11/34* (2006.01)

(52) U.S. Cl.
CPC ........ *G06F 9/5077* (2013.01); *G06F 11/3423* (2013.01); *H04L 41/0853* (2013.01); *H04L 67/1008* (2013.01)

(56) References Cited

U.S. PATENT DOCUMENTS

| | | | |
|---|---|---|---|
| 8,825,731 B2 | 9/2014 | Patil et al. | |
| 9,219,813 B2 | 12/2015 | Deasy et al. | |
| 9,268,612 B2 | 2/2016 | Hintermeister et al. | |
| 10,264,054 B2* | 4/2019 | Bostick | H04L 67/1095 |
| 10,282,233 B2* | 5/2019 | Liu | G06F 9/5027 |
| 2010/0248698 A1 | 9/2010 | In et al. | |
| 2011/0153812 A1 | 6/2011 | Yoon et al. | |
| 2012/0254965 A1* | 10/2012 | Parker | H04L 63/108 726/7 |
| 2013/0151839 A1* | 6/2013 | Rowles | G06F 9/06 713/100 |
| 2015/0242436 A1 | 8/2015 | Bodin et al. | |
| 2016/0004522 A1 | 1/2016 | Connelly et al. | |
| 2018/0234481 A1* | 8/2018 | Bostick | H04W 4/029 |

OTHER PUBLICATIONS

Arslan et al, Computing While Charging: Building a Distributed Computing Infrastructure Using Smartphones, ACM, 2012, entire document.

Duan et al, Truthful Incentive Mechanisms for Social Cost Minimization in Mobile Crowdsourcing Systems, Sensors, 2016, entire document.

Reddy et al, Smartphone as a Virtual Machine, International Journal of Engineering Research & Technology, 2013, entire document.

Botelho, Smartphone hypervisors—what's the use?, Tech Target, 2003-2018, entire document.

Barr et al, The VMware mobile virtualization platform: is that a hypervisor in your pocket?, Operating Systems Review, 2010, entire document.

TTGMedia, Citrix Nirvana phone, http://cdn.ttgtmedia.com/rms/misc/nirvanaPhone.png, Sep. 5, 2018, entire document.

* cited by examiner

CELLULAR HYPERVISOR

BACKGROUND

Mobile virtualization is hardware virtualization on a mobile phone or other device connected to a cellular network that enables operating systems or virtual machines to run simultaneously on the device. A hypervisor is computer software that creates and runs virtual machines. The mobile virtualization uses a hypervisor to create virtual machines in order to create separation between the underlying hardware and the software.

SUMMARY

In one aspect of the present invention, a computerized method for utilizing a computing processing capability of a device connected to a cellular network includes executing steps on a computer processor. Thus, a computer processor is configured to determine processing capabilities of each of a plurality of devices as function of device hardware configuration, software configuration, and average idle utilization, determine first remaining uptime periods of availability that each of the plurality of devices are available for data processing as a function of respective device data comprising battery level, signal strength and usage patterns, wherein the usage patterns are power usage patterns or data usage patterns, in response to receiving a processing task that comprises a needed processing capability, identify a subset of devices that each have a threshold amount of uptime of processing capability in an amount inclusive of the needed processing capability of the task, and assign the processing task to one of the subset devices.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine processing capabilities of each of a plurality of devices as function of device hardware configuration, software configuration, and average idle utilization, determine first remaining uptime periods of availability that each of the plurality of devices are available for data processing as a function of respective device data comprising battery level, signal strength and usage patterns, wherein the usage patterns are power usage patterns or data usage patterns, in response to receiving a processing task that comprises a needed processing capability, identify a subset of devices that each have a threshold amount of uptime of processing capability in an amount inclusive of the needed processing capability of the task, and assign the processing task to one of the subset devices.

In another aspect, a computer program product for utilizing a computing processing capability of a device connected to a cellular network includes executing steps on a computer processor that has a computer-readable storage medium with computer readable program code embodied therewith. The computer readable hardware medium is not a transitory signal per se. The computer determine processing capabilities of each of a plurality of devices as function of device hardware configuration, software configuration, and average idle utilization, determine first remaining uptime periods of availability that each of the plurality of devices are available for data processing as a function of respective device data comprising battery level, signal strength and usage patterns, wherein the usage patterns are power usage patterns or data usage patterns, in response to receiving a processing task that comprises a needed processing capability, identify a subset of devices that each have a threshold amount of uptime of processing capability in an amount inclusive of the needed processing capability of the task, and assign the processing task to one of the subset devices.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
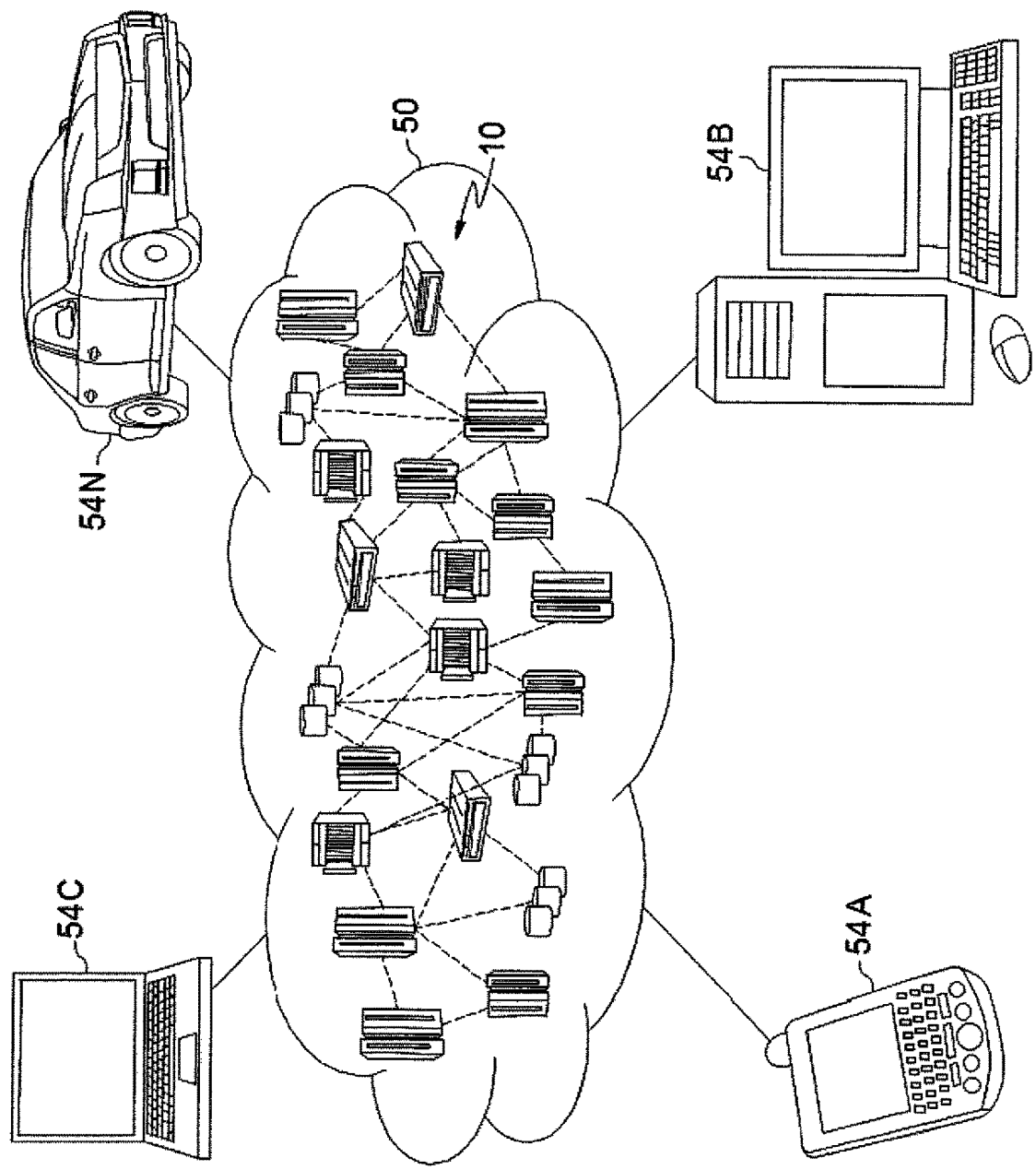
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, mechanically encoded devices such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
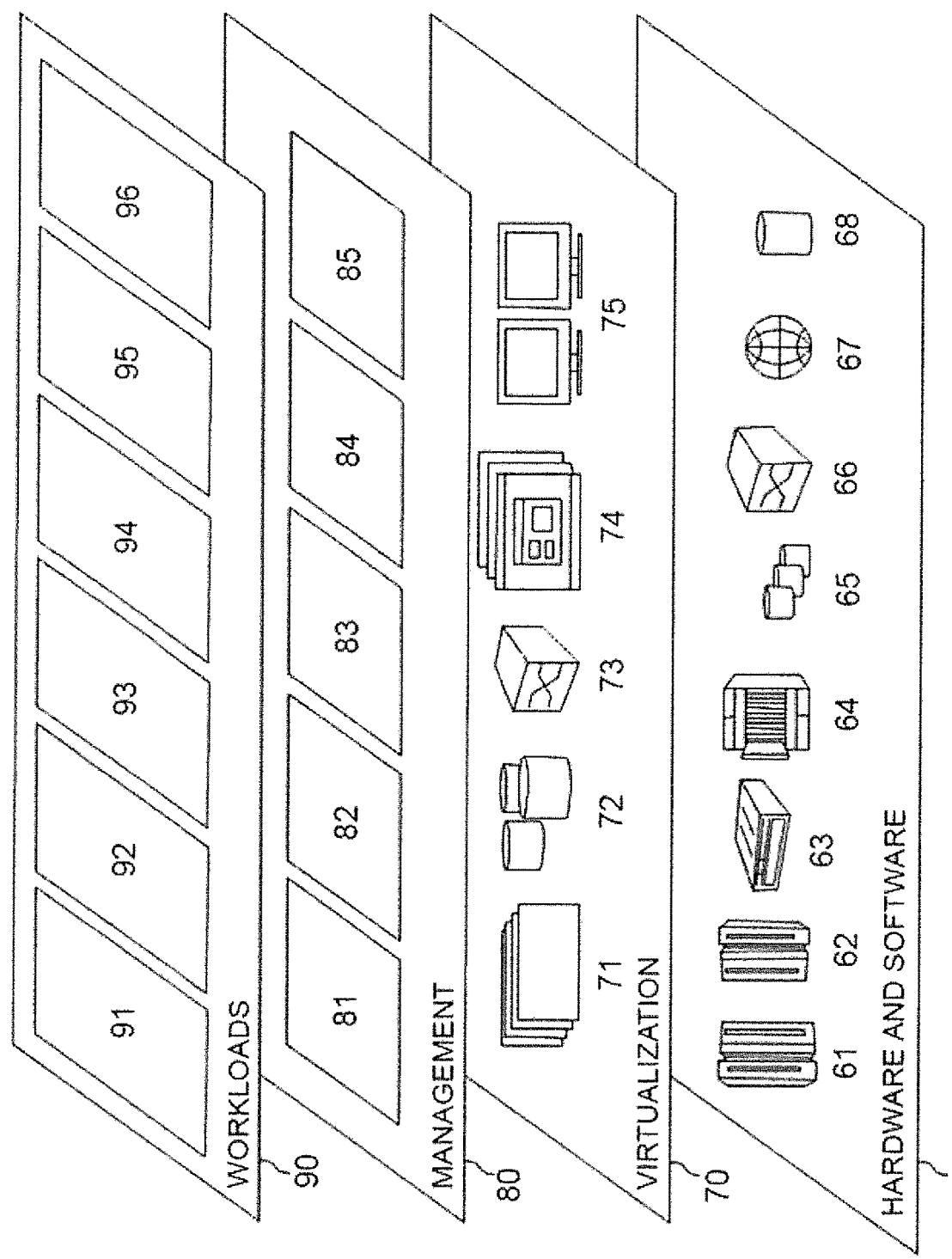
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for utilizing a computing processing capability of a device connected to a cellular network 96.

Figure 3:
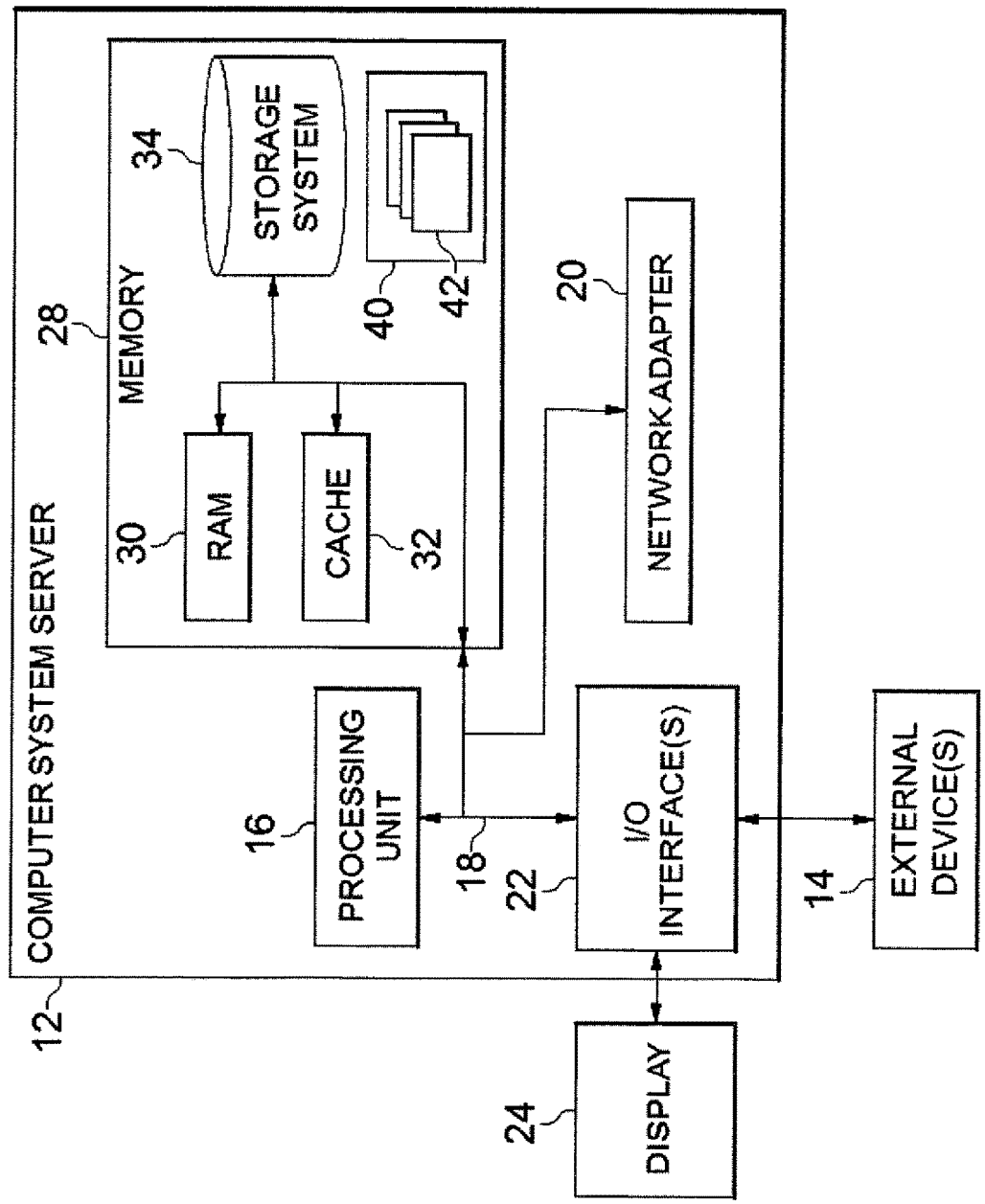
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
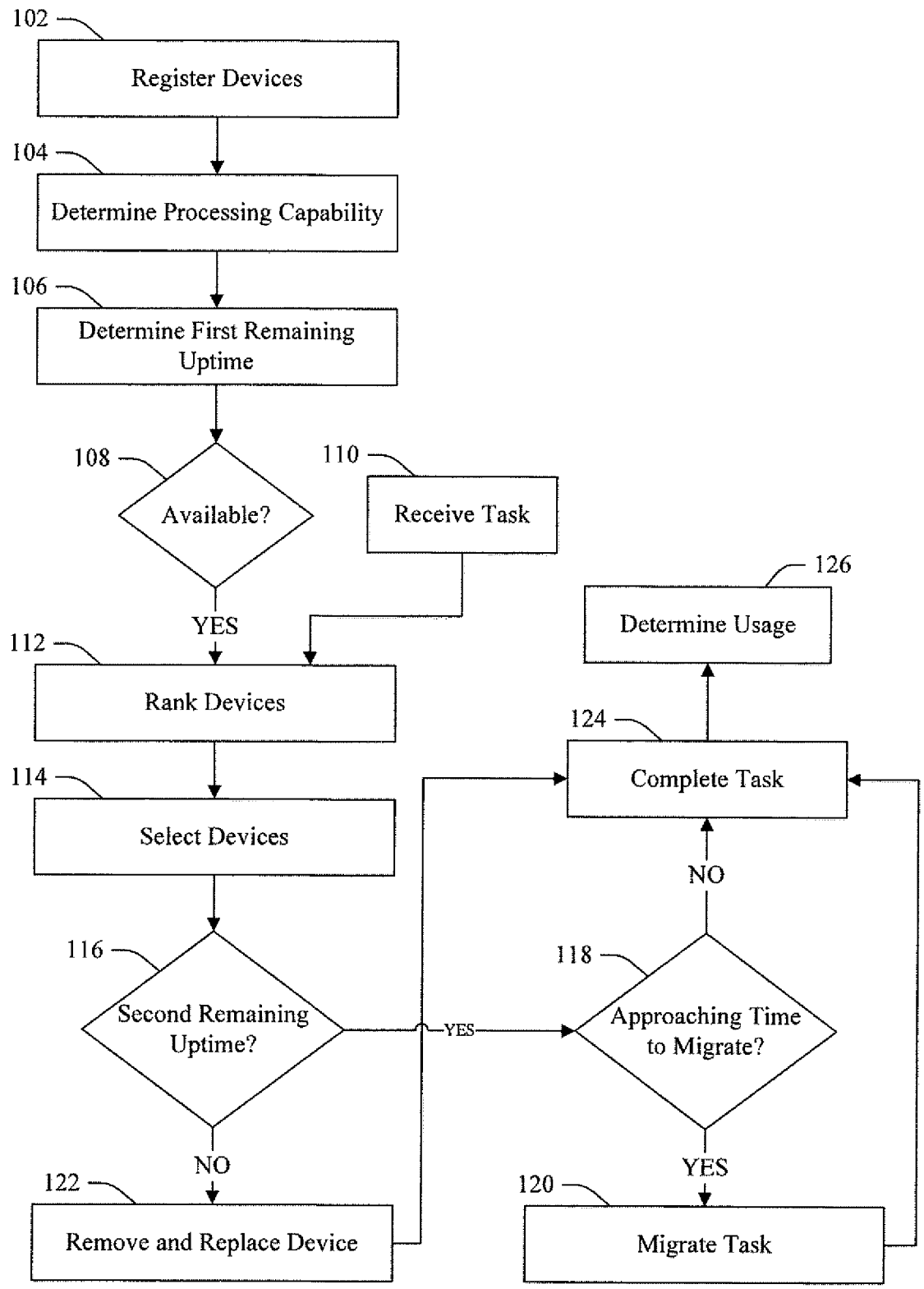
FIG. 4 is a flow chart illustration of an embodiment of the present invention.

FIG. 4 illustrates a process or system according to the present invention for utilizing spare computing capacity of a cellular data network. At 102, a processor that is configured according to an aspect of the present invention (the "configured processor") registers a plurality of devices connected to a cellular network to a cloud based cellular hypervisor. For example, a device may convey the device's Internet Protocol (IP) address to the configured processor thereby identifying the device and allowing registration.

At 104, the configured processor determines a processing capability of a registered mobile device. For example, the device may convey the device's hardware configuration, software configuration and the average idle utilization of the device to the configured process. The configured processor may then determine the total processing capability as a function of the conveyed hardware configuration, software configuration and the average idle utilization.

At 106, the configured processor determines a first remaining uptime of a registered device (i.e., the time remaining before the device disconnects from the cellular network) at a first point in time. In one instance, the configured processor may determine a first remaining uptime of a device as a function of a battery level of the device. For example, the configured processor may determine a battery level of the device and further determine an amount of battery used per a unit of time. For example, if the configured processor determines the device has a 50% battery level and further determines that the device consumes 1% battery every 10 minutes, then the configured processor determines the first remaining uptime as 50 minutes In another instance, the configured processor may determine a first remaining uptime as a time until the device enters a dead zone (an outer boundary location of a coverage area of a wireless data service provider). The time until the device enters a dead zone may be determined as a function a signal strength between the device and a cellular network, a geographic location of the device, a predicted location of the device, and known signal strengths within given geographic locations. For example, the configured may determine a signal strength of the device at a given point in time. The configured processor may further determine a direction and speed of the device as a function of at least two conveyed locations at two different points in time. Based on the determined speed and direction of the device, the configured processor may determine a predicted geographic location of the device. The configured processor may then predict a signal strength at the predicted geographic location as a function of a known signal strength at the predicted geographic location. If the configured processor determines the predicted signal strength is below a predetermined threshold, then the configured processor determines the first remaining uptime as a time until the device reaches the geographic location as a function of the determined speed and direction of the device. For example, if the configured processor determines the device is traveling at 60 miles per hour in a north east direction, and further determines that the device is 30 miles from a dead zone in the same direction, then the configured processor determines the first remaining uptime as 30 minutes.

In another instance, the configured processor determines a first remaining uptime of the device as a function of a usage pattern of the device (i.e., patterns that identify signal fluctuations and peak usage as a function data usage at a given point in time). For example, the configured processor may determine that that device loses connection with a cellular network every Thursday at 5 P.M. The configured processor may determine the first remaining uptime as the time remaining until Thursday 5 P.M.

In another example, the configured processor may determine that the device has a peak usage between 5 and 6 P.M on Tuesdays by determining the amount of data used by the device or by the rate of battery lost over a given time as compared to other time periods. The configured processor may determine the first remaining uptime as the time remaining until Tuesday 5 P.M.

In another yet example, the configured processor may determine the signal strength of the device lessens below a given predetermined threshold at a certain geographic location by determining the signal strength of the device at all geographic locations and may further determine that the device is likely to be in that location between 9 A.M. to 5 P.M. Mondays through Fridays by determining a pattern of device locations. The configured processor may determine the first remaining uptime as the time remaining until 9 A.M. on a weekday.

At 108, the configured processor determines an availability of a registered device as a function of the determined first remaining uptime and the total processing capability with respect to predetermined thresholds. For example, a battery level threshold may include all devices with a battery level of greater than a given amount of battery life remaining (i.e., 25%, 50%, or 75%) are available to perform a task. In another example, a first remaining uptime threshold may include all devices with a given remaining uptime (i.e., 30, 45, or 60 minutes) are available to perform a task. In yet another example, a signal strength threshold may include all devices with a signal strength greater than a given amount (i.e., 25%, 50% or 75%) are available to perform a task. In yet another example, a usage pattern threshold may include that all devices with a pattern indicating that the device is outside of a given predicted time (i.e., 5, 10, or 15 minutes) or outside of a given geographic distance (i.e., 0.5, 1, or 5 miles) from falling below one of the battery level, first remaining uptime, or signal strength threshold are available to perform a task.

At 110, the configured processor receives a task from a cloud catalogue.

At 112, the configured processor ranks the available devices as a function of the devices' ability complete the task. The configured processor may rank the available devices as a function of a characteristic of each device (i.e., processing capability), battery life, signal strength, location, and movement of each device. For example, the configured processor may receive a highly complex task and thereby determine more processing power is needed to complete the task. As a result, the configured processor may rank a first available device with more processing power higher than a second available device with less processing power. In another example, the configured processor may determine that a first available device is traveling towards a location with little to no signal coverage, while a second available device is stationary and in a location with excellent signal strength coverage. As a result, the configured processor may rank the second device higher.

At 114, the configured processor selects a plurality of the highest ranked devices to complete the task and sets the highest ranked device to active (i.e., open to completing the task) while setting the selected devices to standby. For example, the configured processor may select the three highest ranked devices while setting the highest ranked device to active and setting the second and third highest ranked devices to standby.

At 116, the configured processor determines a second remaining uptime of the active device at a second point in time as previously described herein. The second point in time may be a previously determined time period from the first remaining uptime.

At 118, the configured processor determines if the second remaining uptime is approaching an average time to migrate (i.e., an average time needed to switch processing from the active device to a standby device) or if the time to a loss of cellular connection as a function of direction and speed of the active device is approaching an average time to migrate. The configured processor may determine if the second remaining uptime/time to loss of a cellular connection is approaching an average time to migrate based on predetermined thresholds. For example, the configured processor may determine than an average time to migrate is 1 minute and may have previously determined that the remaining uptime is 1 minute 30 seconds, when the threshold for determining that the remaining uptime is approaching an average time to migrate is 30 seconds, then the configured processor determines that the second remaining uptime is approaching an average time to migrate. In another example, if the configured processor determines that the active device is traveling at 60 mph and is 1 mile from an area wherein there is no cellular coverage, and that the average time to migrate is 30 seconds, when the threshold for determining that the remaining uptime is approaching an average time to migrate is 30 seconds, then the configured processor determines that the second remaining uptime is approaching an average time to migrate.

At 120, if the configured processor determined that the second remaining uptime/time to loss of a cellular connection is approaching an average time to migrate, then the configured processor replaces the active device from the group of selected devices with the highest ranked non-selected device and sets the second highest ranked device as active. For example, if the configured processor previously selected the three devices and the second remaining uptime/ time to loss of a cellular connection is approaching an average time to migrate, then the configured processor replaces the first active device with the fourth ranked device, and thereby set to standby, and sets the second ranked device as active.

At 122, if the configured processor is not able to determine the second remaining uptime at the second point in time or at a predetermined number of instances, then the configured processor determines the active device is dead and replaces the active device from the group of selected devices with the highest ranked non-selected device and sets the second highest ranked device as active.

At 124, the configured processor instructs the active device to complete the task.

At 126, the configured determines the amount of processing used by the active device in association with being selected as the active device (i.e., the amount of processing to complete the task or the amount of processing needed to migrate from the active device to a standby device). In one instance, the configured processor determines the amount of processing used by the active device by determining the amount of data used by the active device in association with being selected as the active device. The configured processor may further provide this information to a cellular network provider in order to compensate the owner of the device for the processing usage.

Figure 5:
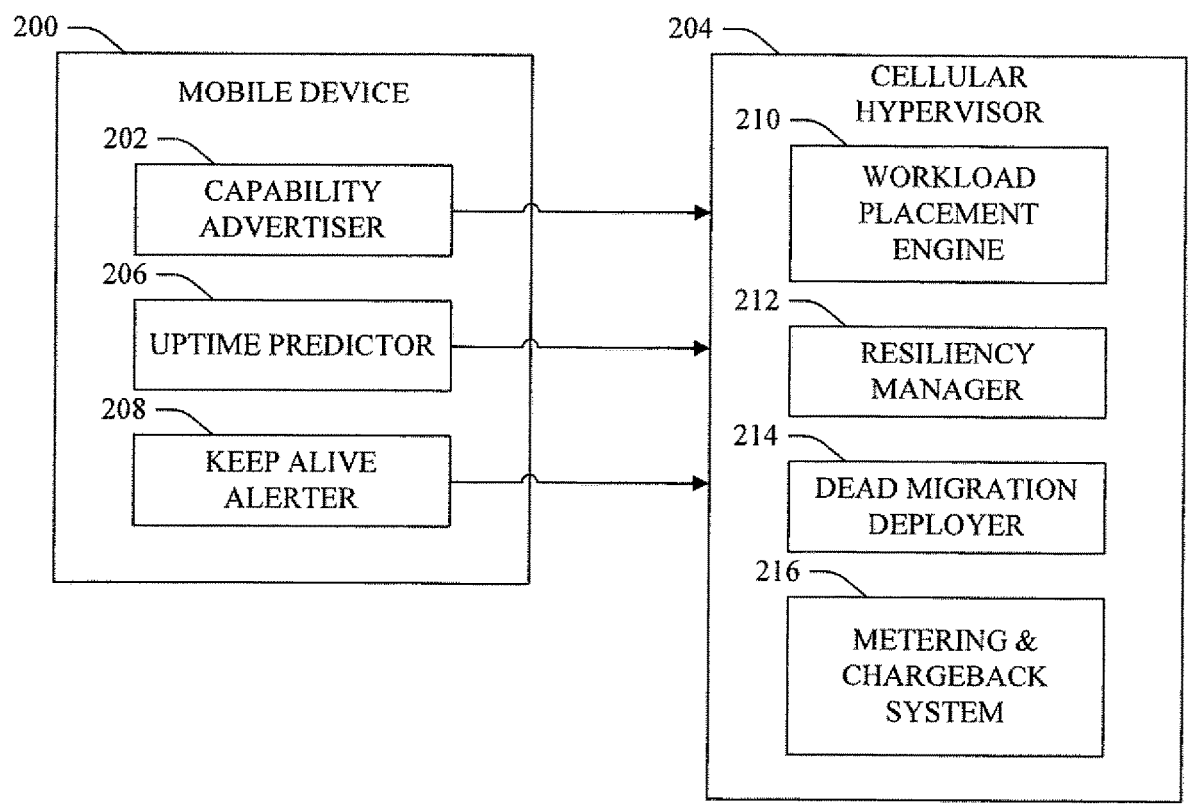
FIG. 5 is another flow chart illustration of an embodiment of the present invention.

FIG. 5 illustrates a process or system according to the present invention configured to perform the steps illustrated in FIG. 4 carried out by the configured processor.

A capability advertiser 202 located on a mobile device 200 conveys a device capability including an IP address, hardware configuration, software configuration and average idle utilization of the device to a cellular hypervisor 204.

An uptime predictor 206 located on the mobile device 200 determines a remaining uptime of the device as described herein and conveys the determined remaining uptime to the cellular hypervisor 204.

A keep alive alerter 208 located on the mobile device 200 periodically conveys a health status including but not limited to a battery level and signal strength of the device to the cellular hypervisor 204.

A workload placement engine 210 located on the cellular hypervisor 204 receives the conveyed device capability from a plurality of devices and a task from a cloud catalogue. The workload placement engine 210 then ranks the plurality devices as a function of their ability to complete the task as described herein and designates the highest ranked device as active device and sets a predetermined number of devices to standby as a function of their rank.

A resiliency manager 212 located on the cellular hypervisor 204 receives the determined remaining uptime for the active and standby devices and determines if the remaining uptime is approaching a time to migrate the task to one of the standby devices as described herein. The resiliency manager further meters the amount of data consumed by the active device in connection with executing the task.

A dead migration deployer 214 determines if the keepalive alerter 208 failed to convey the health status for the active device a predetermined number of times, sets the active device to dead and sets one of the standby devices to active in response as described herein. The dead migration deployer 214 also deprovisions the dead device and replaces the dead device with a new device as described herein.

A metering and chargeback system 216 maintains metering information produced by the resiliency manager 212 during placement, execution, and/or migration of the task.

Smart devices are pervasive and penetrative. Individually, smart devices contain limited processing capabilities, but cumulatively the computing power of phones and tablets in a region may surpass the compute capability of entire data centers. However, any one device in this potential "cellular data center" has several unknown factors like spatial distance from mobile towers, software/hardware configuration, software/hardware state, and behavioral patterns of users in terms of utilization, movement, and availability which this system resolves.

The underutilized potential of the "cellular data center" is harnessed in the form of small-sized, low-power virtual machines (VMs) by consuming the underutilized mobile processing capabilities as a conventional Cloud computing service in an SLA fashion. In a cloud based system, a cloud management stack runs on a "managed from" environment, that orchestrates a virtualized data center, which is the "managed to" environment. As a result, the "cellular data center" is controlled by a conventional cloud stack.

This "cellular data center" is consistent and compatible with existing cloud management models. A "cellular hypervisor" at the hypervisor/IaaS layer of cloud stacks, "virtualizes" mobile data networks. The cloud consumer obtains VMs (including storage and memory) under SLAs, except that, instead of a traditional hypervisor virtualizing a deterministic on-premise data center, the "cellular hypervisor" "virtualizes" an indeterministic cellular network. The cloud service consumer orders conventional IaaS and PaaS services without being aware that the target is the spare capacity of a smart phone in a mobile network.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
determining processing capabilities of each of a plurality of devices as function of device hardware configuration, software configuration, and average idle utilization;
determining speeds and directions of movement for each of the plurality of devices;
determining first remaining uptime periods of availability, one for each of the plurality of devices, as times until the devices are predicted to reach a geographic location as functions of the respective determined speeds and directions of movement of the plurality of devices, wherein the geographic location has a signal strength below a predetermined threshold, and wherein the plurality of devices are available for data processing during their respective first remaining uptime periods of availability as a function of respective device data comprising battery level, signal strength and usage patterns, wherein the usage patterns are power usage patterns or data usage patterns;
in response to receiving a processing task that comprises a needed processing capability, identifying a subset of devices that each have a threshold amount of uptime of processing capability in an amount inclusive of the needed processing capability of the task; and
assigning the processing task to one of the subset of devices.

2. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the determining the processing capabilities of each of the plurality of devices, the determining the first remaining uptime periods of availability, the identifying the subset of devices in response to receiving the processing task that comprises the needed processing capability, and the assigning the processing task to one of the subset of devices.

3. The method of claim 1, wherein the computer-readable program code is provided as a service in a cloud environment.

4. The method of claim 1 further comprising:
ranking the subset of devices in order of relative amounts of their respective determined processing capability of each device during their first uptime periods;
assigning the task to the ranked device having the highest relative amount of determined processing capability as an active device for processing the task; and
assigning the remaining devices of the subset of devices to standby status.

5. The method of claim 4 further comprising:
in response to determining that the first uptime period of the active device will end before the active device is likely to complete processing of the task, determining second remaining uptime periods of availability, one for each of the subset of standby devices, as times the subset of standby devices are available for data processing during their respective second remaining uptime periods of availability as a function of their respective device data; and
migrating the task from the active device to one of the standby devices in response to determining the active device is approaching an end of the first uptime period of the active device.

6. The method of claim 5, further comprising:
migrating the task from the active device to the one of the standby devices in response to determining that the second remaining uptime of the one of the standby devices is an average time to migrate the task from the active device to one of the standby devices.

7. The method of claim 6, wherein the device usage patterns include fluctuations in values of observed amounts of usage of data or power as a function of device location and time; and
wherein determining the first or second remaining uptime periods is further a function of determining that the fluctuations in values comprise a threshold time of the fluctuations in values that are sufficient to meet the needed processing capability of the task over the determined first or second remaining uptime period.

8. The method of claim 7, wherein the device usage patterns include loss of cellular network connectivity; and
wherein determining the first or second remaining uptime periods is further a function of determining that the device loses cellular network connectivity at a given time.

9. A system comprising:
a processor;
a computer readable memory in circuit communication with the processor; and
a computer readable storage medium in circuit communication with the processor; wherein the processor executes program instructions stored on the computer-readable storage medium via the computer readable memory and thereby:
determines processing capabilities of each of a plurality of devices as function of device hardware configuration, software configuration, and average idle utilization;
determines speeds and directions of movement for each of the plurality of devices;
determines first remaining uptime periods of availability, one for each of the plurality of devices, as times until the plurality of devices are predicted to reach a geographic location as functions of the respective determined speeds and directions of movement of the plurality of devices, wherein the geographic location has a signal strength below a predetermined threshold, and wherein the plurality of devices are available for data processing during their respective first remaining uptime periods of availability as a function of respective device data comprising battery level, signal strength and usage patterns, wherein the usage patterns are power usage patterns or data usage patterns;
in response to receiving a processing task that comprises a needed processing capability, identifies a subset of devices that each have a threshold amount of uptime of processing capability in an amount inclusive of the needed processing capability of the task; and
assigns the processing task to one of the subset of devices.

10. The system of claim 9, wherein the processor executes the program instructions stored on the computer-readable storage medium via the computer readable memory and thereby:
ranks the subset of devices in order of relative amounts of their respective determined processing capability of each device during their first uptime periods;

assigns the task to the ranked device having the highest relative amount of determined processing capability as an active device for processing the task; and assigns the remaining devices of the subset of devices to standby status.

11. The system of claim 10, wherein the processor executes the program instructions stored on the computer-readable storage medium via the computer readable memory and thereby:

in response to determining that the first uptime period of the active device will end before the active device is likely to complete processing of the task, determines second remaining uptime periods of availability, one for each of the subset of standby devices, as times the subset of standby devices are available for data processing during their respective second remaining uptime periods of availability as a function of their respective device data; and migrates the task from the active device to one of the standby devices in response to determining the active device is approaching an end of the first uptime period of the active device.

12. The system of claim 11, wherein the processor executes the program instructions stored on the computer-readable storage medium via the computer readable memory and thereby:

migrates the task from the active device to the one of the standby devices in response to determining that the second remaining uptime of the one of the standby devices is an average time to migrate the task from the active device to one of the standby devices.

13. The system of claim 12, wherein the device usage patterns include fluctuations in values of observed amounts of usage of data or power as a function of device location and time; and wherein determining the first or second remaining uptime periods is further a function of determining that the fluctuations in values comprise a threshold time of the fluctuations in values that are sufficient to meet the needed processing capability of the task over the determined first or second remaining uptime period.

14. The system of claim 12, wherein the device usage patterns include loss of cellular network connectivity; and wherein determining the first or second remaining uptime periods is further a function of determining that the device loses cellular network connectivity at a given time.

15. A computer program product for utilizing a computing processing capability of a device connected to a cellular network, comprising executing on a computer processor, the computer program product comprising:

a computer readable storage medium having computer readable program code embodied therewith, wherein the computer readable storage medium is not a transitory signal per se, the computer readable program code comprising instructions for execution by a processor that cause the processor to:

determine processing capabilities of each of a plurality of devices as function of device hardware configuration, software configuration, and average idle utilization;

determine speeds and directions of movement for each of the plurality of devices;

determine first remaining uptime periods of availability, one for each of the plurality of devices, as times until the plurality of devices are predicted to reach a geographic location as functions of the respective determined speeds and directions of movement of the plurality of devices, wherein the geographic location has a signal strength below a predetermined threshold, and wherein the plurality of devices are available for data processing during their respective first remaining uptime periods of availability as a function of respective device data comprising battery level, signal strength and usage patterns, wherein the usage patterns are power usage patterns or data usage patterns;

in response to receiving a processing task that comprises a needed processing capability, identify a subset of devices that each have a threshold amount of uptime of processing capability in an amount inclusive of the needed processing capability of the task; and assign the processing task to one of the subset of devices.

16. The computer program product of claim 15, wherein the computer readable program code instructions for execution by the processor further cause the processor to:

rank the subset of devices in order of relative amounts of their respective determined processing capability of each device during their first uptime periods;

assign the task to the ranked device having the highest relative amount of determined processing capability as an active device for processing the task; and assign the remaining devices of the subset of devices to standby status.

17. The computer program product of claim 16, wherein the computer readable program code instructions for execution by the processor further cause the processor to:

in response to determining that the first uptime period of the active device will end before the active device is likely to complete processing of the task, determine second remaining uptime periods of availability, one for each of the subset of standby devices, as times the subset of standby devices are available for data processing during their respective second remaining uptime periods of availability as a function of their respective device data; and migrate the task from the active device to one of the standby devices in response to determining the active device is approaching an end of the first uptime period of the active device.

18. The computer program product of claim 17, wherein the computer readable program code instructions for execution by the processor further cause the processor to:

migrate the task from the active device to the one of the standby devices in response to determining that the second remaining uptime of the one of the standby devices is an average time to migrate the task from the active device to one of the standby devices.

19. The computer program product of claim 18, wherein the device usage patterns include fluctuations in values of observed amounts of usage of data or power as a function of device location and time; and wherein determining the first or second remaining uptime periods is further a function of determining that the fluctuations in values comprise a threshold time of the fluctuations in values that are sufficient to meet the needed processing capability of the task over the determined first or second remaining uptime period.

20. The computer program product of claim 19, wherein the device usage patterns include loss of cellular network connectivity; and wherein determining the first or second remaining uptime periods is further a function of determining that the device loses cellular network connectivity at a given time.

* * * * *